(12) United States Patent
Suzuki

(10) Patent No.: US 6,324,318 B1
(45) Date of Patent: Nov. 27, 2001

(54) REDUNDANT OPTICAL SOURCE SWITCHING METHOD AND WAVELENGTH DIVISION MULTIPLEXING TRANSMISSION APPARATUS USING THE SAME

(75) Inventor: Yasuo Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/459,886

(22) Filed: Dec. 14, 1999

(30) Foreign Application Priority Data

Dec. 15, 1998 (JP) .................................................. 10-355469

(51) Int. Cl.⁷ ............................... G02B 6/28; H04J 14/02
(52) U.S. Cl. .................................. 385/24; 385/1; 385/15; 385/16; 385/42; 359/127; 359/128
(58) Field of Search .................................. 385/15, 16, 17, 385/18, 19, 20, 21, 22, 23, 24, 42, 47, 1–3; 359/127, 128

(56) References Cited

U.S. PATENT DOCUMENTS

| | | | |
|---|---|---|---|
| 5,113,459 | * 5/1992 | Grasso et al. | 385/24 |
| 5,173,957 | * 12/1992 | Bergano et al. | 385/24 |
| 5,633,741 | * 5/1997 | Giles | 359/124 |
| 5,731,887 | * 3/1998 | Fee | 359/110 |
| 5,739,935 | * 4/1998 | Sabella | 359/128 |
| 5,742,416 | * 4/1998 | Mizrahi | 359/134 |
| 5,777,761 | * 7/1998 | Fee | 359/110 |
| 6,005,694 | * 12/1999 | Liu | 359/110 |

\* cited by examiner

*Primary Examiner*—Brian Healy
(74) *Attorney, Agent, or Firm*—Staas & Halsey LLP

(57) ABSTRACT

A redundant switch method includes a step of producing a substitute light of a wavelength identical to that of a faulty working light source which is one of working light sources having different wavelengths by optical four-wave mixing using a protection light from a protection light source and a branch light which is one of branch lights obtained from the working light sources and has a given relationship with the faulty working light source. A transmission light of the faulty working light source is replaced by the substitute light.

18 Claims, 14 Drawing Sheets

F I G. 1
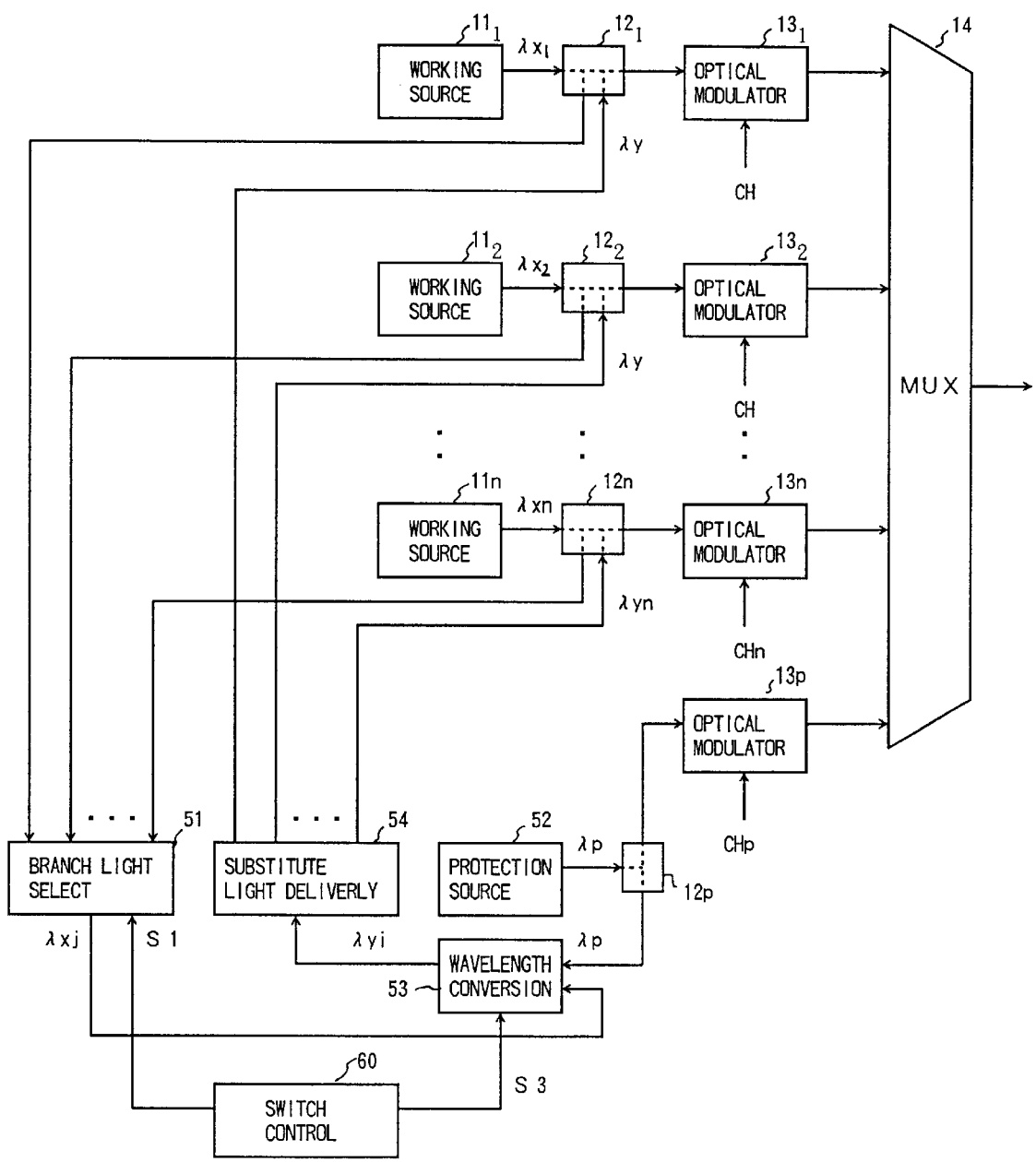

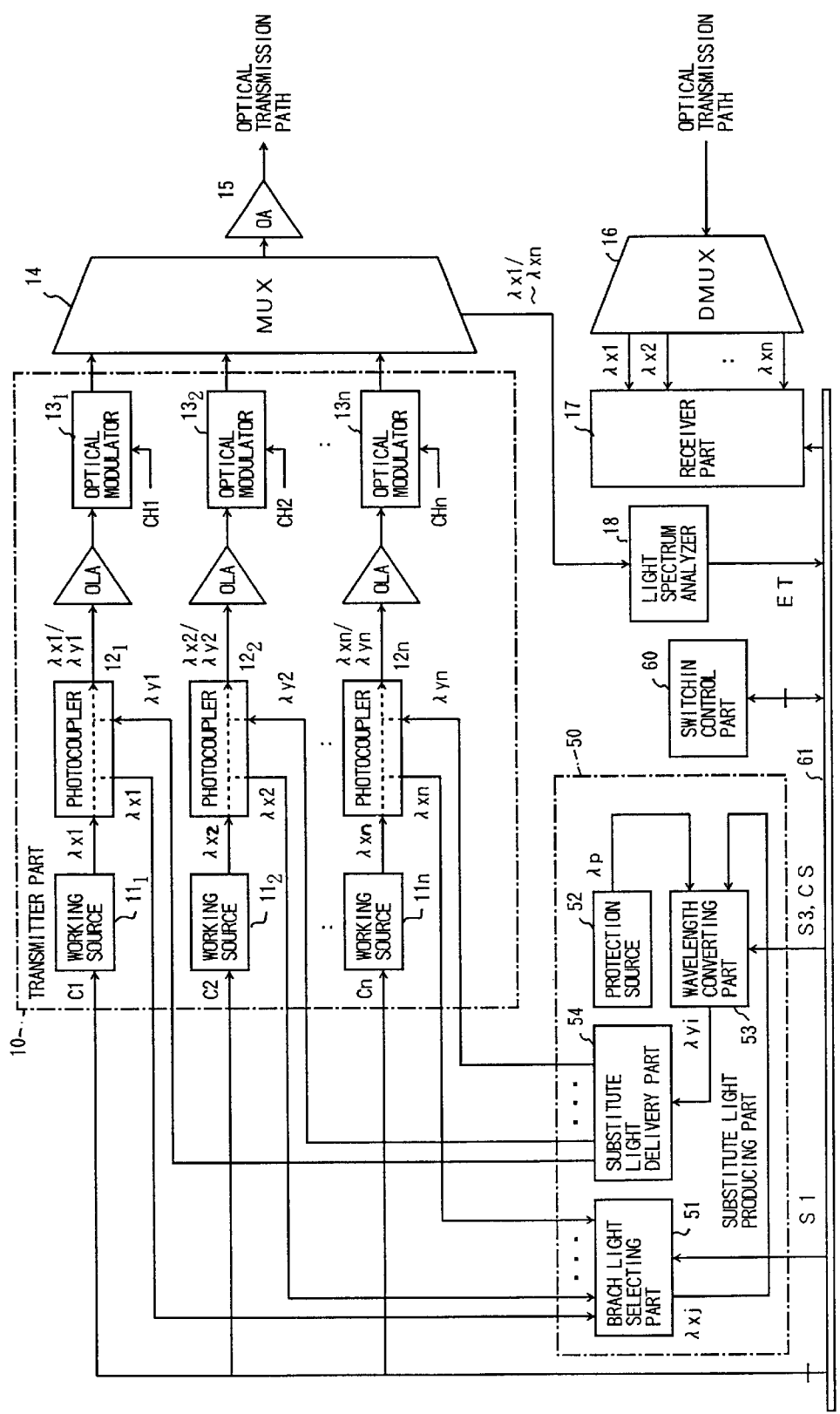

FIG. 14

| | LIGHT SOURCE | WAVELENGTH (λx) OF WORKING SOURCE | WAVELENGTH (λp) OF PROTECTION SOURCE | WAVELENGTH (λy) AFTER CONVERSION |
|---|---|---|---|---|
| GROUP 1 | WORKING 1 | 1550 | — | 1558 |
| | WORKING 2 | 1551 | — | 1557 |
| | WORKING 3 | 1552 | — | 1556 |
| | WORKING 4 | 1553 | — | 1555 |
| | PROTECT 1 | — | 1554 | — |
| | WORKING 5 | 1555 | — | 1553 |
| | WORKING 6 | 1556 | — | 1552 |
| | WORKING 7 | 1557 | — | 1551 |
| | WORKING 8 | 1558 | — | 1550 |
| GROUP 2 | WORKING 9 | 1559 | — | 1567 |
| | WORKING 10 | 1560 | — | 1566 |
| | WORKING 11 | 1561 | — | 1565 |
| | WORKING 12 | 1562 | — | 1564 |
| | PROTECT 2 | — | 1563 | — |
| | WORKING 13 | 1564 | — | 1562 |
| | WORKING 14 | 1565 | — | 1561 |
| | WORKING 15 | 1566 | — | 1560 |
| | WORKING 16 | 1567 | — | 1559 |

(nm)

REDUNDANT OPTICAL SOURCE SWITCHING METHOD AND WAVELENGTH DIVISION MULTIPLEXING TRANSMISSION APPARATUS USING THE SAME

BACKGROUND OF THE INVENTION

1. Field of the Invention

The present invention generally relates to a redundant light source switching method and a wavelength division multiplexing transmission apparatus using such a method. More particularly, the present invention is concerned with a redundant switching method for a working light source in a wavelength division multiplexing transmission system and a wavelength division multiplexing transmission apparatus using the same.

In a high-capacity very-high-speed wavelength division multiplexing transmission system such as a D-WDM (Dense-Wavelength Division Multiplexing), there are provided a double or triple redundant system because the system is greatly affected by occurrence of a failure. It is required, in the event of a failure, that communication services can be restored as shortly as possible.

2. Description of the Related Art

Generally, a semiconductor laser diode, which is a lifetime-limited component, is used as a light source provided on the transmission-line side of the WDM transmission apparatus. Conventionally, only the lifetime of the laser diode by checking a drive current applied thereto is supervised within the WDM transmission apparatus. That is, the conventional WDM transmission apparatus is not equipped with a redundant system capable of immediately coping with a failure of the laser diode. Conventionally, there are the three redundancies in the laser diode.

The first redundancy in the laser diode prepares protection or spare light source packages in a given office. If a working light source becomes faulty, a protection light source package having the same wavelength as the working light source is substituted therefor.

The second redundancy in the laser diode prepares working and protection packages for the respective wavelengths in the WDM transmission apparatus. If a fault occurs in the working package, it is manually replaced by the protection package.

The third redundancy in the laser diode prepares a wavelength-variable protection light source. If a fault occurs, the protection light source is substituted for the faulty light source and is tuned to the wavelength used in the working light source.

However, the first through third redundancies have the following disadvantages.

The first redundancy cannot restore communications soon. Usually, due to an economic issue, protection packages are not provided in all the offices but specific offices located in the respective maintenance areas. Thus, in an event of an office or station failure, it is required to order a protection package from the corresponding specific office located far away therefrom. Thus, it takes a long time to restore communications.

The second redundancy is not economical because each of pairs of packages (working and protection packages) must be provided to the respective wavelength. That is, the number of packages must be doubled in order to implement the second redundancy. Thus, the second redundancy is expensive. In addition, the WDM transmission apparatus requires an increased mounting space.

The third redundancy has a disadvantage in that it is difficult to perform the wavelength control (setting) in a wide wavelength band. Particularly, it is difficult to obtain, by using the wavelength-variable protection light source, almost the same characteristics as the working light source of the given wavelength at the same accuracy as that of the working light source.

SUMMARY OF THE INVENTION

It is a general object of the present invention to provide a light source switching method and a WDM transmission apparatus using the same.

A more specific object of the present invention is to provide a light source switching method capable of accurately and efficiently performing, by using a simple redundant structure of light sources, automatic switching and switching back in economical fashion in the event of a failure and to provide a WDM transmission apparatus using such a method.

The above objects of the present invention are achieved by a redundant switch method comprising the steps of: producing a substitute light of a wavelength identical to that of a faulty working light source which is one of working light sources having different wavelengths by optical four-wave mixing using a protection light from a protection light source and a branch light which is one of branch lights obtained from the working light sources and has a given relationship with the faulty working light source; and replacing a transmission light of the faulty working light source by the substitute light.

The above objects of the present invention are also achieved by a WDM apparatus comprising: working light sources having different wavelengths; a protection light source having a wavelength different from those of the working light sources; photocouplers which cause lights from the working light sources to branch and add substitute lights to optical transmission routes of the working light sources; a branch light selecting part which selects one of branch lights from the photocouplers in accordance with a control signal externally supplied; a wavelength converting part which produces the substitute lights by optical four-wave mixing using the branch lights from the photocouplers and the protection light from the protection light source; a substitute light delivery part which deliver the substitute lights to the photocouplers; and a switching control part which controls the branch light selecting part and the wavelength converting part so that one of the substitute lights which has a wavelength identical to that of a faulty one of the working light sources is produced and applied to a corresponding one of the photocouplers.

BRIEF DESCRIPTION OF THE DRAWINGS

Other objects, features and advantages of the present invention will become more apparent from the following detailed description when read in conjunction with the accompanying drawings, in which:

FIG. 1 is a block diagram showing the principle of the present invention;

FIG. 2 is a block diagram of a WDM transmission apparatus (transmitter receiver) according to a first embodiment of the present invention;

FIG. 14 is a diagram showing a light wavelength array used in the embodiments of the present invention.

DESCRIPTION OF THE PREFERRED EMBODIMENTS

Figure 3A:
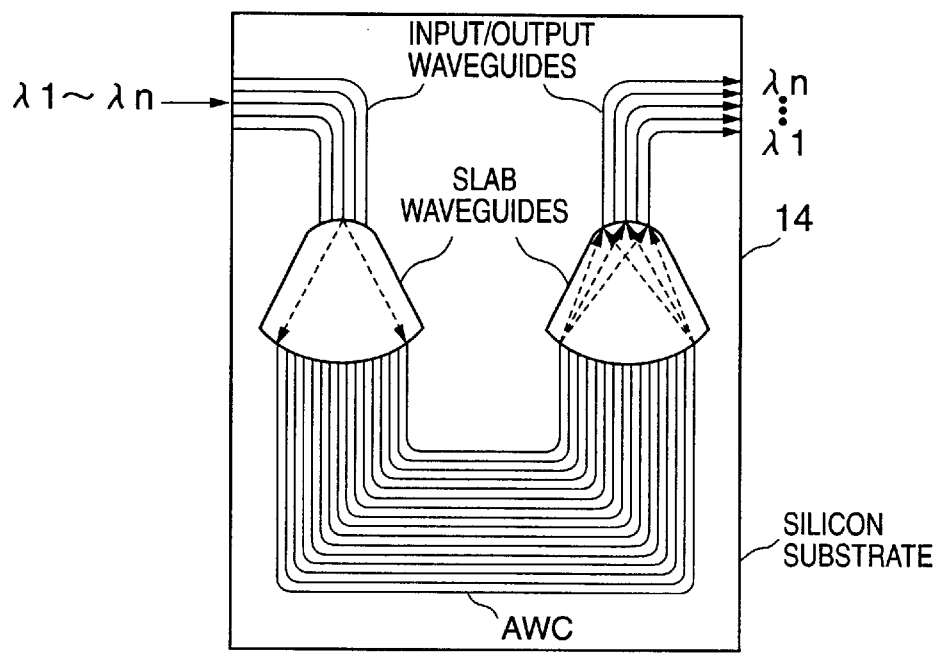
FIGS. 3A and 3B are diagrams of an optical multiplexer/demultiplexer used in the first embodiment of the present invention.

FIG. 1 is a block diagram showing the principle of the present invention.

Work light sources $11\text{-}1\text{–}11\text{-}n$ respectively emit lights of wavelengths $\lambda x1\text{–}\lambda xn$. An optical four-wave mixing is performed so that a light $\lambda p$ emitted from a protection light source 52 is mixed with a branch light $\lambda xj$ which is one of the branch lights of the working light sources $11\text{-}1\text{–}11\text{-}n$, the branch light $\lambda xj$ having a predetermined relationship with the defective working light source $11i$ ($\lambda xi$). The above mixing results in a substitute light $\lambda yi$ of the same wavelength as that of the faulty working light source ($\lambda xi$). The substitute light $\lambda yi$ is substituted for the transmission light $\lambda xi$ of the faulty light source.

(1) According to the present invention, the substitute light $\lambda yi$ for the faulty light source $11i$ is produced based on the branch light $\lambda xj$ of the normal working light source $11j$ and the light $\lambda p$ of the protection light source 52. Hence, the transmission system of the normal working light source $11j$ is not affected at all. Also, the substitute light $\lambda yi$ is produced by the optical four-wave mixing operation on the branch light $\lambda xj$ of the normal working light source $11j$ and the protection light $\lambda p$. Thus, it is possible to accurately produce the substitute light $\lambda yi$ of the same wavelength as that of the faulty light source $\lambda xi$. Further, since the light sources (dc light) are subjected to switching, it is not required to perform the switching control at high speed.

(2) Preferably, the branch light $\lambda p$ of the protection light source 52 is used for a protection communication channel in a transmission path section. If a failure is detected in any of the working or active channels in the transmission path section, the main signal transmitted by the channel which becomes defective is transmitted using the branch light $\lambda p$ of the protection light source. Thus, the light of the protection light source can be used as not only a substitute light for the faulty working light source but also a substitute light for any of the working communication channels. As a result, the protection light source can efficiently be used.

(3) Preferably, the wavelength of the protection light source is located in the center middle of an array of wavelengths of the working light sources arranged at constant intervals.

Generally, in the optical four-wave mixing of input lights $\lambda xj$ and $\lambda p$, when the input light $\lambda p$ is considered as a pump (exciting) light, the following is output as a four-wave mixed light (phase-conjugate light (FWM light)) $\lambda yi$:

$$\lambda yi = 2\lambda p - \lambda xj.$$

Now, in order to simplify the description, it is assumed that the normal branch lights are arrayed so that $\lambda xj=7, 6, 5, 3, 2$ and $1$, and the protection light is located at the center of the array so that $\lambda p=4$. In this case, the substitute lights are arrayed so that $\lambda yi=1(=8-7), 2(=8-6), 3(=8-5), 5(=8-3), 6(=8-2), 7(=8-1)$. Hence, even if any of the working light sources becomes defective, another normal working light source can be substituted therefor. By arranging the wavelength $\lambda p$ in the center of the array, the protection communication channel is located in the center of the optical transmission path passage wavelength band on the transmission path section. Thus, it is possible to provide a high-quality, high-reliability protection communication channel.

(4) Preferably, the substitute light is produced by using the following equation:

$$\lambda yi = 2\lambda p - \lambda xj$$

where $\lambda yi$ is the wavelength of the substitute light, $\lambda xj$ is the wavelength of one of the working light sources having said given relationship with the faulty working light source.

(5) It is also possible to achieve the above-mentioned objects of the present invention as follows. Referring to FIG. 1 again, the WDM transmission apparatus comprises: working light sources $11\text{-}1\text{–}11\text{-}n$ having different wavelengths $\lambda x1\text{~}\lambda xn$; a protection light source (52) having a wavelength $\lambda p$ different from those of the working light sources; photocouplers $12\text{-}1\text{–}12\text{-}n$ which cause lights $\lambda x1\text{~}\lambda xn$ from the working light sources to branch and add substitute lights $\lambda y1\text{~}\lambda yn$ to optical transmission routes of the working light sources; a branch light selecting part 51 which selects one of branch lights from the photocouplers in accordance with a control signal S1 externally supplied; a wavelength converting part 53 which produces the substitute lights $\lambda yi$ by optical four-wave mixing using the branch lights $\lambda xj$ from the photocouplers and the protection light $\lambda p$ from the protection light source; a substitute light delivery part 54 which deliver the substitute lights to the photocouplers; and a switching control part 60 which controls the branch light selecting part and the wavelength converting part so that one $\lambda yi$ of the substitute lights which has a wavelength identical to that of a faulty one $11\text{-}i$ ($\lambda xi$) of the working light sources is produced and applied to a corresponding one of the photocouplers.

(6) Preferably, the WDM apparatus of (5) further comprises: a photocoupler $12p$ which causes the protection light $\lambda p$ to branch; an optical modulator $13p$ which modulates a branch protection light from the photocoupler by an electric main signal CHp; an optical multiplexer (MUX) 14 which multiplexes the branch protection light and signal lights from the working light sources and sends a multiplexed signal to a transmission path section, wherein the branch protection light is made to be modulated by a main signal CHi of a faulty channel which is one of working channels.

(7) Preferably, in the apparatus of (5), the wavelength of the protection light source is located in a center of a wavelength array in which the wavelengths of the working light sources are arranged at equal intervals.

(8) It is preferable that the apparatus of (5) is configured so that the switching control part 60 produces the substitute light using the following equation:

$$\lambda xj = 2\lambda p - \lambda xi.$$

where $\lambda xj$ is the wavelength of the faulty light source, $\lambda xi$ is the wavelength of one of the branch lights to be selected by the branch light selecting part, and $\lambda p$ is the wavelength of the protection light source. Hence, it is possible to easily identify the working light source used to produce the substitute light. Alternatively, the working light source can be identified by using a table stored in the memory, as will be described in detail.

Figure 4A:
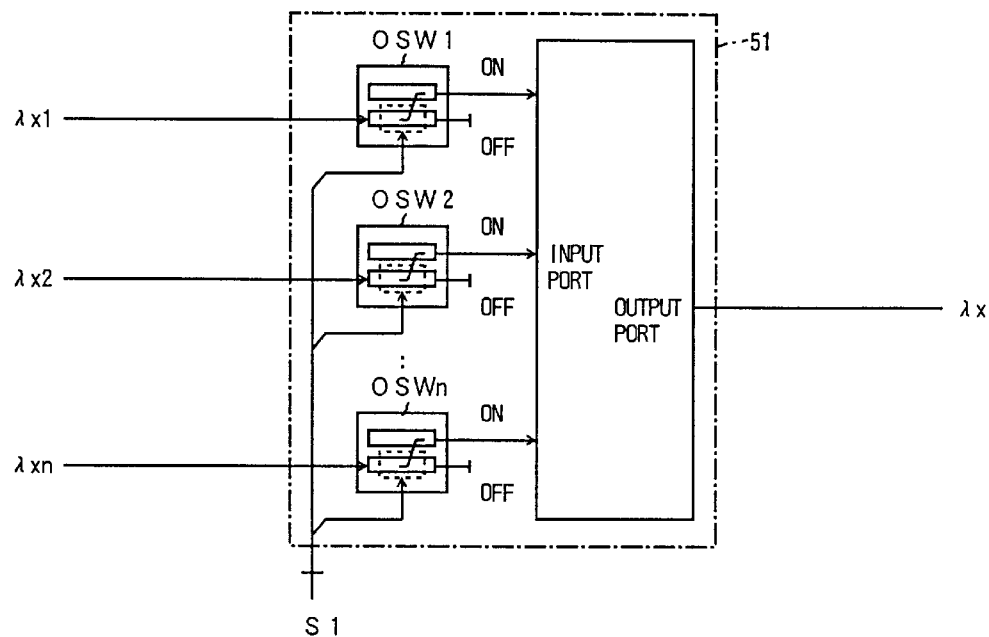
FIGS. 4A, 4B and 4C are diagrams of a branch light selecting part used in the first embodiment of the present invention.

(9) It is preferable that the apparatus of (5) is configured so that the branch light selecting part 51 comprises, as shown in FIG. 4A: a plurality of optical switches (OSW1~OSWn) turning ON/OFF the branch lights in accordance with an external control signal S1; and an optical multiplexer (AWG) which multiplexes the branch lights from the optical switches.

Figure 4B:
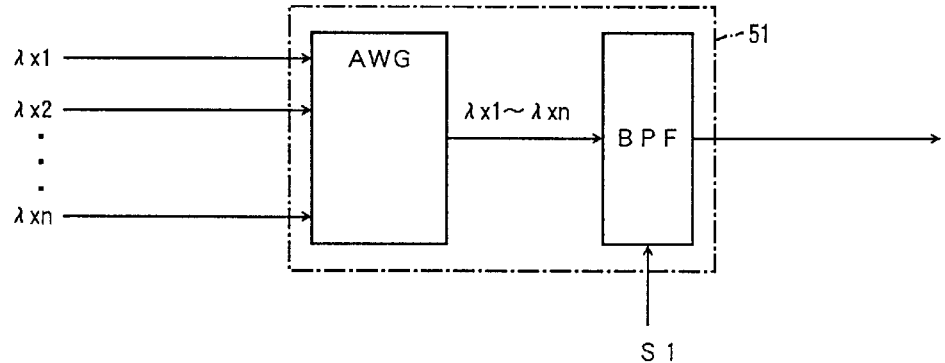

(10) It is preferable that the apparatus of (5) is configured so that the branch light selecting part 51 comprises, as shown in FIG. 4B: an optical multiplexer (AWG) which multiplexes the branch lights; and a band-pass filter (BPF) which allows only one of the branch lights arranged in a multiplexed formation to pass therethrough.

(11) It is preferable that apparatus of (5) comprises: an optical multiplexer (AGW) which multiplexes the branch lights; an optical fiber Bragg grating (FBG) which reflects only one of the branch lights arranged in a multiplexed formation in accordance with an external control signal S1; and an optical circulator (OC) interposed between the optical multiplexer and the fiber Bragg grating.

Figure 6A:
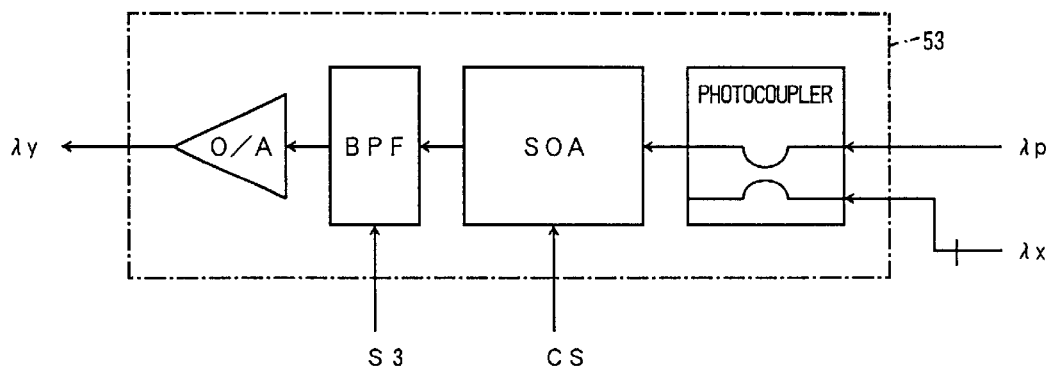
FIGS. 6A, 6B and 6C are block diagrams of a wavelength converting part used in the first embodiment of the present invention.

(12) It is preferable that the apparatus of (5) is configured so that the wavelength converting part 53 comprises a semiconductor optical amplifier (SOA) as an optical non-linear element for the optical four-wave mixing, as shown in FIG. 6A.

Figure 6B:
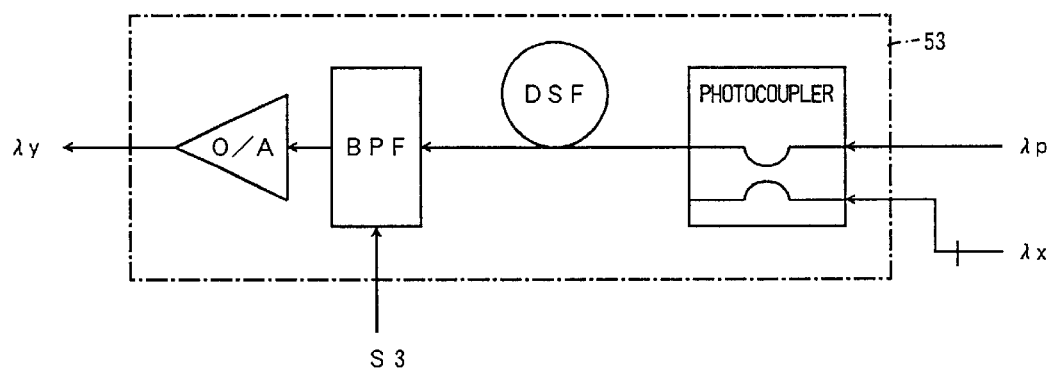

(13) It is preferable that the apparatus of (5) is configured so that the wavelength converting part 53 comprises a dispersion shift fiber (DSF) as an optical non-linear element for the optical four-wave mixing, as shown in FIG. 6B.

(14) It is preferable that the apparatus of (5) is configured so that the wavelength converting part 53 comprises a DFB laser diode (DFB-LD) as an optical non-linear element for the optical four-wave mixing, and a pump light $\lambda p$ generated in the DFB laser diode is used as a protection light source instead of the protection light source separately provided. Hence, it is possible to efficiently produce the four-wave mixed light (phase-conjugate light). In addition, there is no need to separately provide the protection light source 52, so that the circuit configuration can be simplified.

(15) It is preferable that the apparatus of (12) is configured so that the wavelength converting part 53 comprises a band-pass filter (BPF) which is provided on an output side of an optical non-linear element and which has a variable pass-band range controllable by an external control signal S3.

(16) It is preferable that the apparatus of (5) is configured so that the switching control part 60 turns OFF adding of the substitute light $\lambda yi$ after the faulty working light source 11-$i$ is restored and starts to emit a light output. Hence, a breakdown of light does not take place, and non-breakdown switchback in data transmission can be achieved.

(17) It is preferable that the apparatus of (12) further comprises optical limiters (OLA) provided at output sides of the photocouplers 12, the optical limiters causing the semiconductor optical amplifiers to operate in a gain saturation range. Hence, even when the light output level is increased by 3 dB due to an event that the restored light $\lambda xi$ and the substitute light $\lambda yi$ are temporarily combined, the light output level is maintained at an approximately constant level. Thus, the light signals of the other wavelengths are not affected.

(18) It is preferable that the apparatus of (12) comprises optical limiters (OLA) provided at output sides of the photocouplers, the optical limiters causing the semiconductor optical amplifiers which are rare-earth doped optical amplifiers (for example, erbium-doped optical fibers) to operate in a gain saturation range (the gain saturation ranges are defined for the respective wavelengths).

FIG. 2 is a block diagram of a WDM transmission apparatus according to a first embodiment of the present invention. Referring to FIG. 2, the transmission apparatus, which is a WDM transmitter receiver, includes a transmitter part 10, working light sources 11-1–11-$n$, photocouplers 12-1–12-$n$, optical modulators 13-1–13-$n$, an optical multiplexer 14, an optical amplifier (OA) 15, an optical demultiplexer (DMUX) 16, and a receiver part 17. The transmitter part 10 modulates working lights of wavelengths $\lambda x1$–$\lambda xn$ by electric signals CH1–CHn (on the order of giga bits) of respective channels. The working light sources 11-1–11-$n$ generate dc lights of the wavelengths $\lambda x1$–$\lambda xn$, respectively. Each of the photocouplers 12-1–12-$n$ splits the corresponding one of the working lights $\lambda x1$–$\lambda xn$ into two components and combines the corresponding one of the substitute lights $\lambda y1$–$\lambda yn$ with one of the two split components. In other words, the photocouplers 12-1–12-$n$ cause the lights from the working light sources 11-1–11-$n$ to branch and add substitute lights $\lambda y1$–$\lambda yn$ to the optical transmission routes of the working light sources 11-1–11-$n$. The optical modulators 13-1–13-$n$ are of the Mach-Zehnder type. The optical multiplexer 14 multiplexes signal lights of the wavelengths $\lambda x1$–$\lambda xn$. The optical amplifier 15 amplifies the multiplexed signal light. The optical demultiplexer 16 demultiplexes an input multiplexed signal light into signal lights of the wavelengths $\lambda x1$–$\lambda xn$. The receiver part 17 demodulates the signal lights of the wavelengths $\lambda x1$–$\lambda xn$ to the electric signals CH1–CHn of the channels.

Further, the transmission apparatus includes a light spectrum analyzer 18 and the substitute light producing part 50. The substitute light producing part 50 includes the branch light selecting part 51, the protection source 52, the wavelength converter 53, and the substitute light delivery part 54. The transmission apparatus includes a switching control part 60, which controls a control bus 61. The light spectrum analyzer 18 performs a spectrum analysis of the wavelengths $\lambda x1$–$\lambda xn$ or the multiplexed signal light thereof. For example, the spectrum analysis supervises the light output levels and the wavelengths. The substitute light producing part 51 selects one ($\lambda xj$) of the branch lights of the wavelengths $\lambda x1$–$\lambda xn$ in accordance with a control signal S1. The protection light source generates the protection light source (pump light source) of the fixed wavelength $\lambda p$. The wavelength converter 53 produces the wavelength-converted substitute light (hereinafter, sometimes referred to as a four-wave mixed light or phase-conjugate light) $\lambda yi$ on the basis of an optical non-linear effect (an optical non-regenerate optical four-wave mixing) using the branch light $\lambda xj$ and the protection light $\lambda p$. The substitute light delivery part 54 delivers the substitute light $\lambda p$ to the corresponding photocoupler 12 based on the wavelength of the input light to be replaced. The switching control part 60 includes a CPU, which performs the automatic redundant switch/switchback control for the working light sources, and a memory in which a control program describing the above control is stored.

In the transmitter part 10, the dc lights of the wavelengths $\lambda x1$–$\lambda xn$ emitted by the working light source 11-1–11-$n$ branch at the photocouplers 12-1–12-n. The electric main signals CH1–CHn are superimposed on the working lights λx1–λxn from the photocouplers 12-1–12-n by the optical modulators 13-1–13-n. The output lights of the photocouplers 12-1–12-n are then transmitted to another remote party via the optical multiplexer 14. The branch lights of the wavelengths λx1–λxn are applied to the branch light selecting part 51, which selects one (λxj) of them in accordance with the control signal S1 from the switching control part 60. The selected branch light (λxj) is supplied to the wavelength converting part 53. The photocouplers 12-1–12-n are equipped with a light adding function, and receive the substitute lights λy1–λyn from the substitute light delivery part 54 when any of the working light sources becomes defective.

The substitute light producing part 50 sends the dc light λp from the protection light source 52 to the wavelength converting part 53. The wavelength converting part 53 generates the substitute light (four-wave mixed light/phase-conjugate light) λyi of the converted wavelength by thee non-degenerate optical four-wave mixing of the branch light λxj from the branch light selecting part 51 and the protection light λp from the protection light source 52. The wavelength λyi of the substitute light satisfies the following equation:

$$\lambda yi = 2\lambda p - \lambda xj$$

where λp is the wavelength of the pump light (protection light) in the non-degenerate optical four-wave mixing, and λxj is the wavelength of the probe light (branch light). In this case, it is preferable to arrange the wavelengths λxj of the normal working light sources and the wavelength λp of the protection light source in a predetermined array. Thus, it is possible to produce the substitute light wave λyi (i=1~n) of the wavelength equal to the wavelength λxi (i=1~n) of the faulty light source from the light waves λxj (j=n~1) of the other normal working light sources.

FIG. 14 shows a light wave array employed in the embodiments of the present invention. The following description is directed to a case where a light wave array of group 1 is employed. In the group 1, the working light sources 11-1–11-8 are respectively assigned wavelength arrays λx1~λx4, λx5~λx8 (=1550~1553 nm, 1555~1558 nm) arranged at intervals of 1 nm. The wavelength λp is positioned in the center of the above light wave array.

In the above array, the wavelength λyi of the substitute light produced using, for example, the normal working light source λx8 (=1558 nm) is equal to 1550 nm (λyi=3108−1555), and is thus used as the substituted for the working light source 11-1. By way of another example, the wavelength λyi of the substitute light produced using, for example, the normal working light source λx7 (=1557 nm) is equal to 1551 nm (λyi=3108−1557), and is thus used as the substituted for the working light source 11-2. The above holds true for the other working light sources. The wavelength λyi of the substitute light produced using, for example, the normal working light source λx1 (=1550 nm) is equal to 1558 nm (λyi=3108−1550), and is thus used as the substituted for the working light source 11-8. That is, even if a failure occurs in any of the normal working light sources 11i (i=1~8), the faulty light source can be replaced using the corresponding one of the normal working light sources 11j (j=8~1). Thus, even if the light sources 11-1–11-8 become faulty, they can be replaced by using the branch lights of the other normal working light sources 11-8–11-1. The above description can be applied to the group 2.

The above light wave replacement is always vailable when the wavelengths of the light sources re arrayed at equal intervals and the wavelength of the protection light source is located in the center of the array. The light wave replacement does not depend on the numeral values of the wavelength intervals, and is maintained even when an increased number of wavelengths is used. Thus, the light wave replacement of the present invention can be applied to a wavelength array described in the proposed standard recommendations Gmcs (wavelength intervals of 0.8 nm) of ITU-T. Also, although the above description is directed to the array of the 1.5 μm band, the light wave replacement can be applied to, for instance, the 1.3~1.6 μm band.

As described above, it is possible to produce the substitute light λyi of the wavelength equal to the wavelength λxi of the faulty light source by the non-regenerate optical four-wave mixing carried out by the wavelength converting part 53 using the protection light λp and the corresponding one of the other normal working light sources. The substitute light λyi thus produced is applied to the photocoupler associated with the defective light source.

A description will now be given of a redundant switch/switchback operation in the event of a failure in the working light source 11-2.

The light spectrum analyzer 18 supervises the working channel lights (light output levels, wavelengths and so son) available in the multiplexer 14. Provided that a failure in the wavelength λx2 of the working light source 11-2 is detected, the light spectrum analyzer 18 informs the switching control part 60 of detection of the above failure. Responsively, the switching control part 60 sends the control signal C2 to the faulty light source 11-2, which is caused to stop emitting the light output. Further, the switching control part 60 obtains, by the following expression, the wavelength λxj of the other normal working light source to be selected by the branch light selecting part 51 by using the wavelength λp of the protection light source 52 and the wavelength λx2 of the faulty light source 11-2:

$$\lambda xj = 2\lambda p - \lambda x2 = \lambda x7.$$

Alternatively, the wavelength λx7 can also be obtained from the table shown in FIG. 14. Further, the switching control part 60 supplies the branch light selecting part 51 with the control signal S1 for selecting the wavelength λx7. Thus, the branch light selecting part 51 selects the branch light wave λx7 from the working light source 11-7. The switching control part 60 supplies a wavelength-variable light band-pass filter built in the wavelength converting part 5 with a wavelength select signal S3 for extracting the substitute light λy2 (=λx2). Thus, the wavelength converting part 53 extracts only the substitute light λy2 (=λx2) from the total four-wave mixed light including the protection light λp and the branch light λx7. Further, the substitute light λy2 (which has the same level as that of the working light wave λx2) is added to the photocoupler 12-2 associated with the faulty light source 11-2 via the substitute light delivery part 54, and is then used as the substitute light source.

When the faulty light source 11-2 is restored or replaced by a new one so that communication services become available, the working light λx2 and the substitute light λy2 re temporarily combined at the photocoupler 12-2. Thus, the light output level of the photocoupler 12-2 is temporarily doubled (3 dB up). However, the light output level of the photocoupler 12-2 does not break down, so that non-breakdown switchback in data transmissions can be realized. Then, the supply of the substitute light λy2 is stopped, and only the restored light source 11-2 works. Thus, the light output of the photocoupler 12-2 returns to the standard level. After the above switchback is completed, the respective parts are returned to the initial states, so that the apparatus becomes the standby state in which the apparatus is ready for occurrence of failure.

A description will be given of the structures of the main parts of the WDM transmitter receiver according to the first embodiment of the present invention.

Figure 3B:
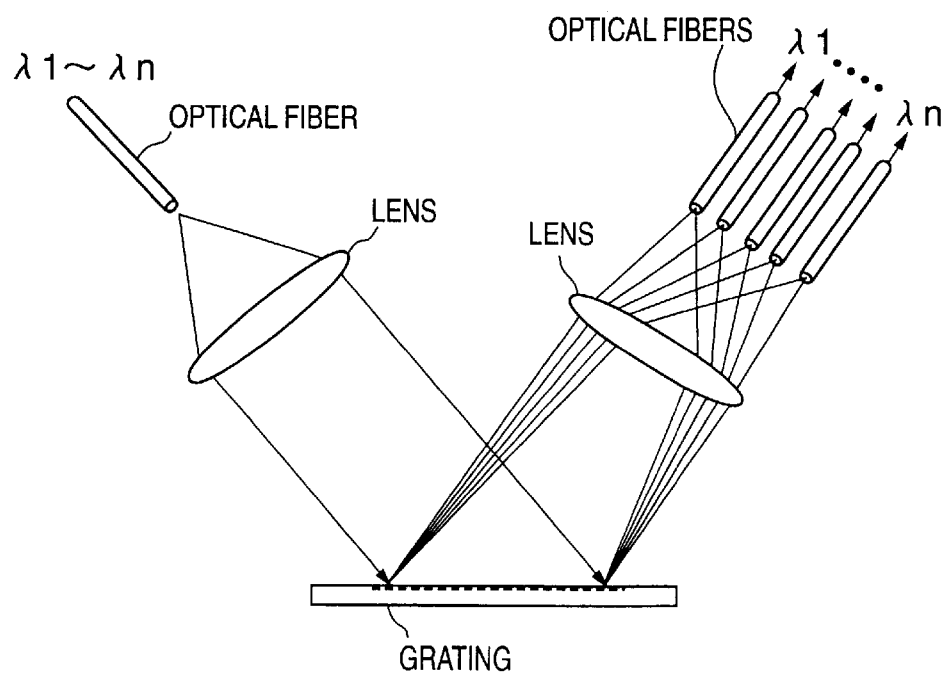

FIGS. 3A and 3B are diagrams depicting the optical multiplexer/demultiplexer. More particularly, FIG. 3A shows a structure of the optical multiplexer/demultiplexer 14/16 using an arrayed-waveguide grating (AWG).

Referring to FIG. 3A, the curvature centers of input and output slab waveguides are formed on a silicon substrate 14' and are positioned in the centers of the waveguide ends of input/output waveguide groups. The array waveguide groups (AWG) are radially arranged so that the respective optical axes pass through the curvature centers. The slab waveguides and the array waveguide groups have an optical arrangement which is the same as a convex mirror and function as a lens. More particularly, multiplexed lights λ1~λn entering the input waveguides are spread by a diffraction in the input-side slab waveguide and drive the AWG waveguide group with the same phase. The waveguides of the AWG are spaced apart from each other so as not to be coupled with each other, and the respective lengths thereof are mutually different from each other by a constant value ΔL. Thus, the respective phases of the lights after propagation of the AWG waveguides obtained at the ends thereof mutually differ from each other by a constant value. On the other hand, in the output-side slag waveguides, the lights radiated from the ends of the AWG waveguides are diffracted in particular directions in which respective in-phase conditions satisfy taking into consideration the above-mentioned phase differences. Thus, single-color lights λ1~λn separated into the respective wavelengths are obtained at the ends of the output waveguides. By using the AWG element as described above, it is possible to configure the light demultiplexer 16. By using the AWG element in the reverse direction, it is possible to configure the multiplexer 14.

FIG. 3B shows the light multiplexer/demultiplexer 14/16 using a reflection-type grating. Further, the light multiplexer/demultiplexer 14/16 can be configured by other various types of optical components.

Figure 4C:
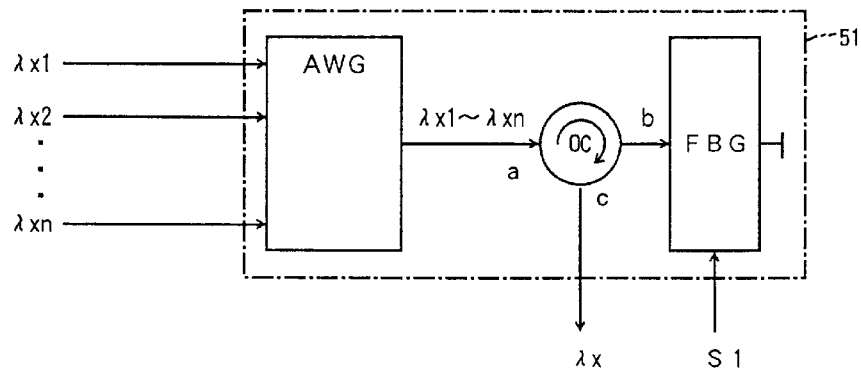

FIGS. 4A, 4B and 4C are block diagrams of the branch light selecting part 51 used in the first embodiment of the present invention. More particularly, FIG. 4A shows a first structure of the branch light selecting part 51. The input branch light waves λx1~λxn are applied to input ports of an AWG multiplexer via optical switches OSW1–OSWn of a directional coupler type. The switching control signal S1 is normally OFF. In this case, the branch lights λx1~λxn are output to OFF-side terminals of the optical switches OSW1–OSWn. If necessary, the OFF-side terminals are terminated in the non-reflection fashion. When the branch light λx1 is to be selected, only the control signal S1 applied to the optical switch OSW1 is turned ON. Thus, the propagation constant of the waveguide portion of the switch OSW1 is controlled, so that the input branch light λx1 is output to an ON-side terminal thereof. Further, the branch light λx1 is applied to the input port of the AWG multiplexer, and is output to a common output port of the multiplexer via the built-in AWG element. The other branch lights λx2~λxn are processed in the same manner as described above. The optical switches OSW1–OSWn may be formed of optical switches having different structures such as those of Mach-Zehnder type, total reflection type, asymmetry Y-branch type and optical gate type.

FIG. 4B shows a second structure of the branch light selecting part 51. The branch light waves λx1~λxn are combined by the AWG multiplexer, and a multiplexed light is output therefrom. A band-pass filter (BPF) allows only the wavelength λxj indicated by the control signal S1 for wavelength selection externally supplied to pass therethrough.

FIG. 4C shows a third structure of the branch light selecting part 51. The branch light waves λx1~λxn are combined by the AWG multiplexer, and a multiplexed light is output therefrom. Further, the multiplexed light is applied to an input terminal a of an optical circulator OC, and is output via an output terminal b to a fiber Bragg grating (FBG) in which the wavelength to be reflected can be varied. The fiber Bragg grating FBG reflects only the particular wavelength (for example, λx1) dependent on the control signal S1. The reflected light λx1 is input to the terminal b of the optical circulator OC, so that only the desired light λxj (=λx1) can be obtained via the output terminal c.

Figure 5:
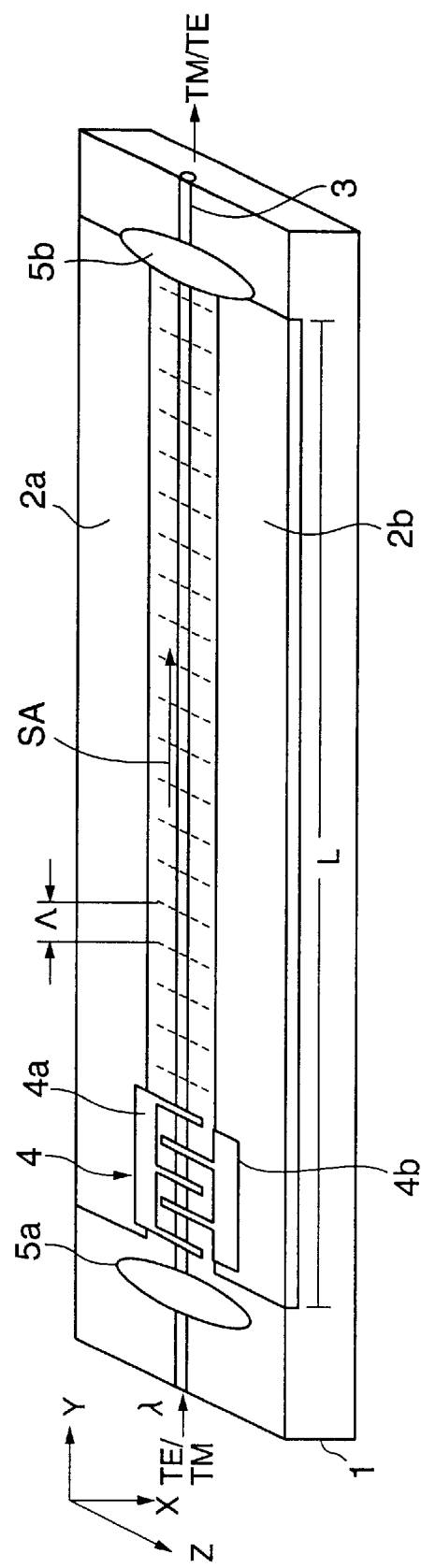
FIG. 5 is a perspective view of a frequency-variable acousto-optic filter used in the first embodiment of the present invention.

FIG. 5 is a perspective view of a wavelength-variable filter (an acousto-optic tunable wavelength filter) used in the first embodiment of the present invention. The wavelength-variable filter shown in FIG. 5 includes an optical waveguide formed on an acousto-optic substrate, and a transducer which causes a surface acoustic wave (abbreviated as SAW) to be propagated through along the above optical waveguide so that the surface acoustic wave crosses the optical waveguide. The surface acoustic wave can be controlled by an electric signal applied to the transducer. Various interactions can be produced in the light wave propagated through the optical waveguide under the surface acoustic wave (grating).

In FIG. 5, a reference number 1 indicates an acousto-optical substrate made of a LiNbO$_3$ X-cut (Y-propagation) plate. Reference numbers 2a and 2b indicate high-concentration diffused regions, and a reference number 3 indicates a Ti-diffused optical waveguide (channel optical waveguide). A reference number 4 indicates a interdigital transducer (IDT) which drives the surface acoustic wave on the optical waveguide. Reference numbers 4a and 4b indicate comb electrodes formed of a thin film of a metal such as Al. Reference numbers 5a and 5b indicate SAW absorbers made of a soft substance such as wax or rubber.

The rigid high-concentration Ti-diffused regions 2a and 2b are provided on opposing sides of the substrate 1. The acoustic velocity is increased in the diffused regions 2a and 2b. Thus, SAW power is confined on the surface portion of the substrate 1 interposed between the regions 2a and 2b, so that the SAW drive power can be reduced. The use of the thermal diffusion method makes it possible to vary the refractive indexes no and ne of the normal and abnormal light beams by an approximately equal amount.

The transducer 4 is mounted on one end (the light input side) of the substrate 1, and an RF signal is applied across the comb electrodes 4a and 4b. Thus, the SAW can be produced by the piezoelectric performance of LiNbO$_3$. The following expression stands:

$$1 = \Lambda/2$$

where 1 is the distance between the comb electrodes 4a and 4b, and Λ/2 is the wavelength of the SAW. In this case, the SAW power produced in the substrate 1 is calculated by multiplying the RF signal power by an efficiency. The SAW traveling toward the light input side is absorbed by the absorber 5a, and disappears immediately. On the other hand, the SAW traveling toward the light output side is propagated, at the acoustic velocity (phase speed), through the surface portion of the substrate 1 interposed between the regions 2a and 2b.

When a polarized wave of a TE-mode light (or TM-mode light) is applied to the waveguide input end, the polarized plane thereof is rotated by 90 degrees (adjustable by SAW power) at a given functional length L due to the elastic-optic effect caused by the SAW traveling through the waveguide. Thus, the polarized wave of the TE (or TM) mode is converted into that of the TM (or TE) mode. When the absorber 5b is provided in the above position, no interaction with the SAW takes place in the following portion of the waveguide 3. Thus, the polarized wave of the TM (or TE) mode can be obtained at the waveguide output end.

In the above case, the following phase match condition stands:

$$|\beta_{TE} - \beta_{TM}| = (2\pi/\lambda)|N_{TE} - N_{TM}| \quad (1)$$
$$= 2\pi/\Lambda$$
$$= 2\pi f/v$$

where $\beta_{TE}$ and $\beta_{TM}$ are respectively propagation constants of the modes TE and TM, and $N_{TE}$ and $N_{TM}$ are respectively effective refractive indexes thereof, $\Lambda$ is the wavelength of the SAW, f is the frequency thereof, and v is the phase speed thereof. That is, the mode conversion takes place due to the SAW of the frequency f satisfying the equation (1), and the conversion efficiency thereof can be controlled by the SAW power. Further, the following expression can be obtained from expression (1):

$$\lambda = \Lambda|N_{TE} - N_{TM}| \quad (2).$$

By way of a numerical example, the factor $|N_{TE}-N_{TM}|$ of double refraction obtained when $LiNbO_3$ is used is approximately 0.072. Thus, $\Lambda$ is nearly equal to 21.5 $\mu$m in order to produce the above-mentioned mode conversion with the light of the wavelength $\lambda$ of 1550 nm used in optical communications. The acoustic velocity v available on the substrate 1 is approximately 3700 m/s. Hence, it is required that the RF signal has a frequency f (=v/$\Lambda$) of 172 MHz. The input RF power depends on the interaction function length L between the input light and the SAW. If L=30 mm, the RF power is approximately equal to 10 mW. Thus, it is possible to efficiently convert the input TE/TM wave into the output TM/TE wave with a low RF signal level and a low RF power. Further, by providing a polarizer (not shown for the sake simplicity) for extracting the TM (or TM) wave at a later stage, it is possible to configure a wideband acousto-optic tunable wavelength band-pass filter BPF. The above tunable band-pass filter BPF can be used in the wavelength converter 53.

Figure 6C:
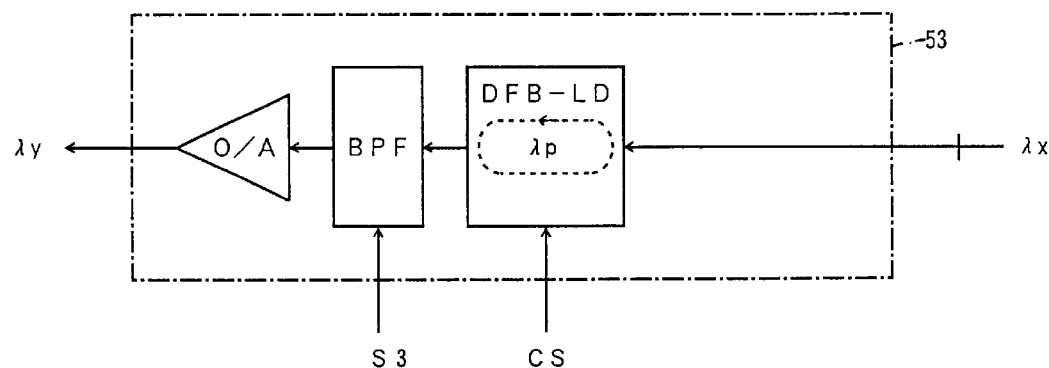

FIGS. 6A, 6B and 6C are block diagrams of structures of the wavelength converting part used in the first embodiment of the present invention.

FIG. 6A shows a first structure of the wavelength converting part in which a semiconductor optical amplifier (SOA) is used as a non-linear optical amplifier element of the wavelength converting part 53. The protection light $\lambda$p from the protection light source 52 and the branch light $\lambda$p from the branch light selecting part 51 are combined by a photocoupler, and the combined light is applied to the semiconductor optical amplifier SOA. At that time, it is preferable that the protection light (pump light) is set to the linear polarization beforehand and that a polarization compensating part is provided in the optical path of the branch light $\lambda$x in order to maintain the polarization plane of the branch light from the working light source in a fixed state. For example, the branch light has the same polarization plane as that of the protection light. Thus, the polarization dependence can be eliminated from the phase-conjugate light (FWM light) of the output of the semiconductor optical amplifier SOA, and the FWM can be produced in stable fashion. The polarization compensating part can be formed of a normal polarization compensating or polarization conservative filter.

In the semiconductor optical amplifier SOA, the phase-conjugate light wave $\lambda$y of the wavelength satisfying the following expression can be obtained by the optical four-wave mixing of the protection light (pump light) $\lambda$p and the branch light (signal light) $\lambda$x:

$$\lambda y = 2\lambda p - \lambda x.$$

The lights of the wavelengths $\lambda$y, $\lambda$p and $\lambda$x are input to the wavelength-variable band-pass filter BPF of the later stage. The filter BPF extracts only the phase-conjugate light $\lambda$y in accordance with the wavelength select signal S3 from the switching control part 60. The phase-conjugate light $\lambda$y thus extracted is amplified so as to have a given power (equal to the optical power of the working light source) by an optical amplifier OA, and is output to the outside of the wavelength converting part 53. The output ON/OFF of the phase-conjugate light $\lambda$y is controlled by turning ON/OFF the function of the semiconductor optical amplifier SOA or the output thereof in accordance with a control signal CS externally applied thereto. The semiconductor optical amplifier SOA is formed of an amplifier having an amplification band included in a given band located in the range of 1.3 $\mu$m–1.6 $\mu$m.

FIG. 6B shows a second structure of the wavelength converting part 53, in which a dispersion shift fiber DSF is used as the non-linear optical amplifier element. In the dispersion shift fiber DSF, the phase-conjugate light (FWM light) of the wavelength $\lambda$y having the following expression is obtained by the optical four-wave mixing of the protection light (pump light) $\lambda$p and the branch light (signal light) $\lambda$x:

$$\lambda y = 2\lambda p - \lambda x.$$

When the dispersion shift fiber DSF is used, an optical switch (not shown for the sake of simplicity) is provided in order to implement output ON/OFF control of the phase-conjugate light $\lambda$y. In this case, normally, the FWM light is inhibited from being output. In response to the wavelength select signal S3 from the switching control part 60, the band-pass filter BPF is automatically tuned to the specified wavelength. The above optical switch can be implemented by an arrangement in which a normal switch is provided in series or loss in each wavelength of the BPF is controlled. The dispersion shift fiber DSF is formed of an optical fiber having a zero-dispersion wavelength in a given band in the range of 1.3 $\mu$m–1.6 $\mu$m.

FIG. 6C shows a third structure of the wavelength converting part 53, in which a distributed feedback laser diode (DFB-LD) is used as the non-linear optical amplifier element. In the DFB-LD, the pump light $\lambda$p can be generated therein. Thus, the protection light source 52 provided outside and the photocoupler provided inside can be omitted. In the DFB-LD, the phase-conjugate light $\lambda$y can be generated by the optical four-wave mixing of the protection light (pump light) $\lambda$p and the branch light (signal light) $\lambda$x:

$$\lambda y = 2\lambda p - \lambda x.$$

Figure 7A:
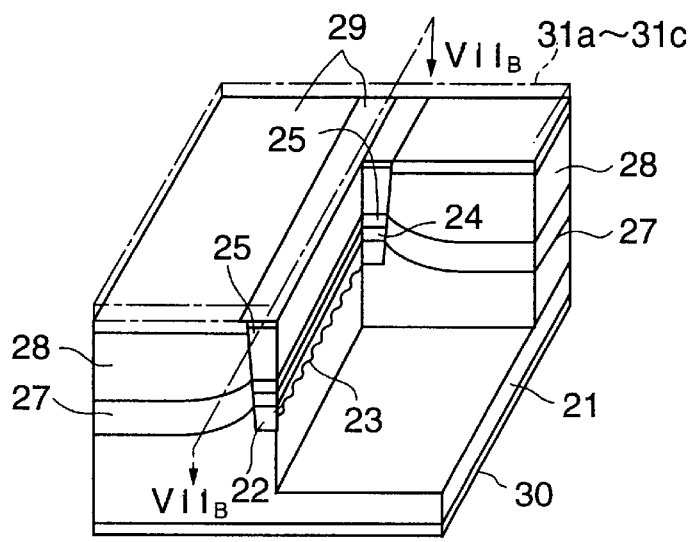
FIG. 7 is a spectrum diagram of a DFB laser diode.
Figure 7B:
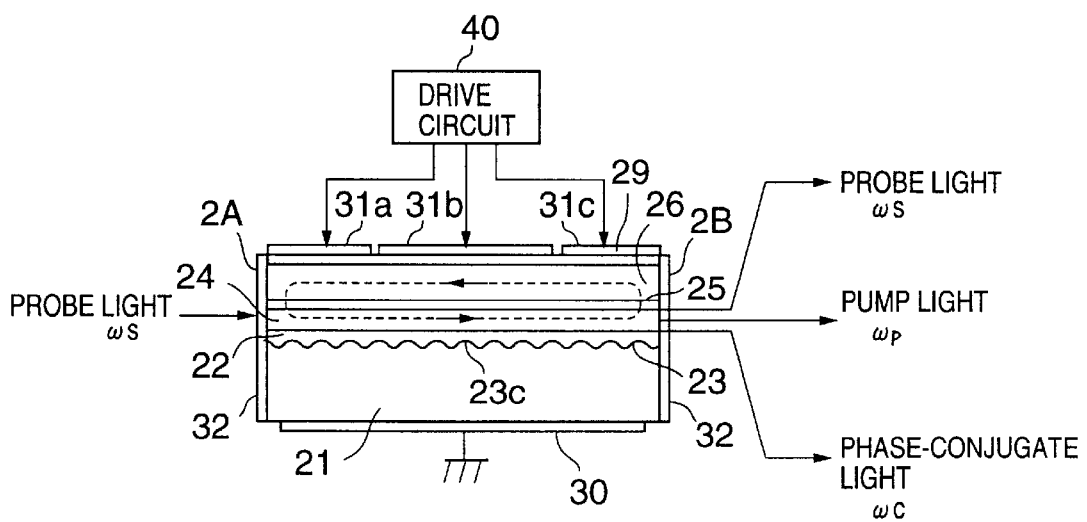

A detailed description will now be given of the DFB-LD with reference to FIGS. 7A, 7B and 8. More particularly, FIG. 7A is a partially broken perspective view of the DFB-LD. Referring to FIG. 7A, an n-type InGaAsP guide layer 22 is formed on the upper surface of an n-type InP substrate 21. A grating 23 of a wave shape is formed in the junction between the substrate 21 and the layer 22 in such a manner that the film thickness is periodically changed in the light traveling direction. The grating 23 has a phase shift structure in which he period is shifted by λ (λ is the wavelength of the light in the waveguide structure) in a substantially center portion 23c. Further, an undoped multiquantum well (MQW) active layer 24 is formed on the guide layer 22. Further, a p-type InGaAsP guide layer 25 and a p-type InP layer 26 are formed on the active layer 24 in this order. The MQW active layer 24 has five $In_{x'}Ga_{1-x'}As$ (x'=0.532) well layers each having a thickness of 7 nm and five $Ga_xIn_{1-x}As_yP_{1-y}$ (x=0.283, y=0.611) barrier layers each having a thickness of 10 nm in an alternately stacked formation. The layers from the p-type InP layer 26 to the upper portion of the n-type InP substrate 21 are patterned into a convex shape facing downwards, and the plane shape thereof is a stripe shape extending in the light traveling direction. As shown in FIGS. 7A and 7B, p-type InP layer 27 and an n-type InP layer 28 are formed in this order at both sides of the convex portion of the stripe shape in the n-type InP substrate 21. Further, a p-type InGaAsP layer 29 is formed on the uppermost p-type InP layer 26 and n-type InP layer 28. An n-side electrode 30 is formed on the lower surface of the p-type InP substrate 21. Further, three divided p-side electrodes 31a, 31b and 31c are formed on the supper surface of the p-type InGaAsP layer 29.

FIG. 7B is a cross-sectional view taken along a line $VII_B$—$VII_B$ shown in FIG. 7A. The following description assumes that the pump light λp is a pump light ωp, the input branch light λx is a probe light ωs, and the phase-conjugate light λy is a phase-conjugate light ωc. Non-reflection films 32 are coated on end surfaces 2A and 2B of the DFB-LD in order to cause the phase-conjugate light ωc (four-wave mixed light) to pass therethrough. For example, the resonator length thus structured is 900 μm, the length of the p-side electrode 31b located in the center is approximately 580 μm, and the lengths of the p-side electrodes 31a and 31c are approximately 160 μm.

A drive current flows from the p-side electrodes 31a–31c to the n-side electrode 30 vai the MQW active layer 24. Thus, a continuous oscillation takes place in the MQW active layer so that the light of the wavelength 1549 nm is continuously generated at a power of 40 mW. In this case, a current of 400 mA is applied to the p-side electrodes 31a–31c. The oscillated light is strongly confined in the DFB-LD due to the function of the two gratings 23. Thus, a single-mode, narrow-gain-bandwidth, stable spectrum can be obtained. The above oscillated light can be used as the pump light ωp in the optical four-wave mixing. The non-reflection coating provided to the both ends of the end surfaces 2A and 2B causes light waves having different frequencies from that of the oscillated light ωp to be reflected within the DFB-LD. In this state, when the probe light (signal light) ωs is supplied via the first pump end (end surface) 2A, the probe light ωs, a part of the pump light ωp and the phase-conjugate light ωc are output via the second pump end (end surface) 2B due to the non-regenerate optical four-wave mixing. The term "non-regenerate" is used as a meaning such that the wavelengths of the probe light ωs and the pump light ωp are different from each other. The intensity of the phase-conjugate light ωc is proportional to the second power of the intensity of the pump light ωp.

Figure 8:
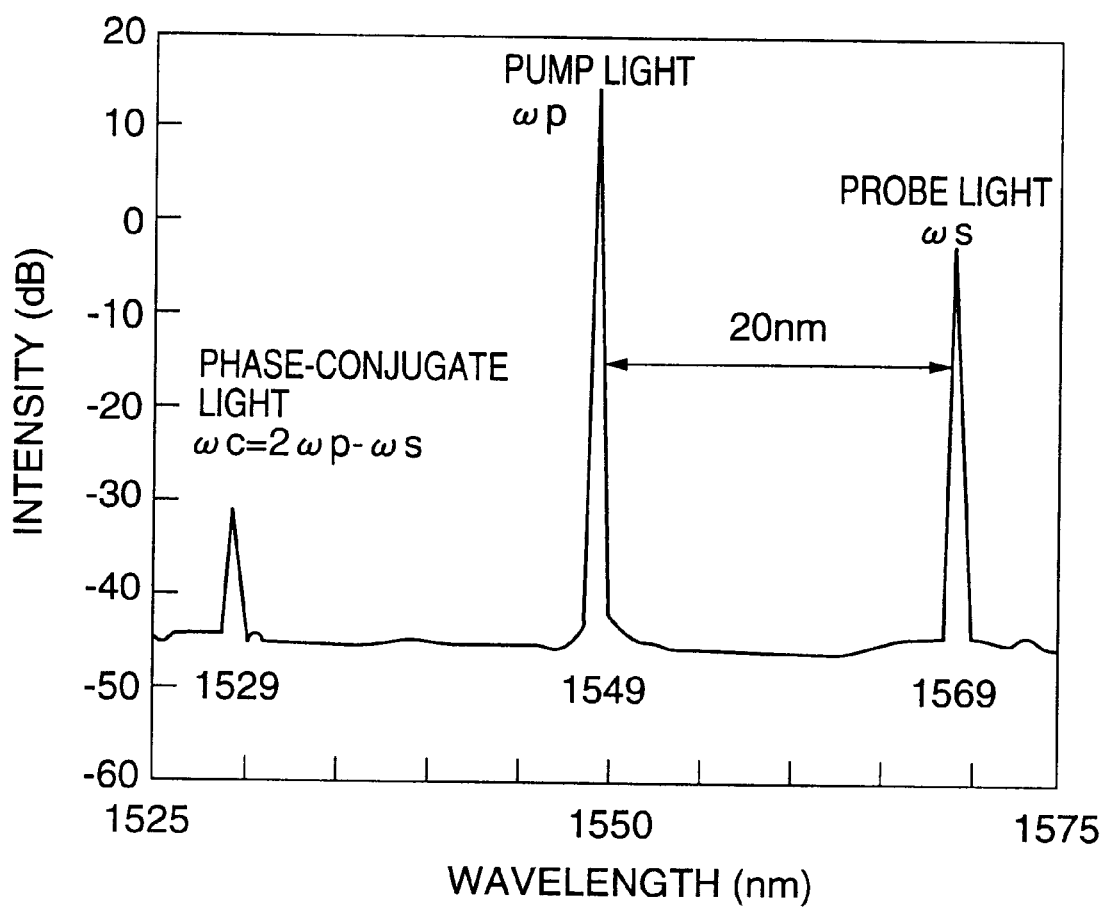
FIG. 8 is a diagrams of the DFB laser diode.

FIG. 8 shows a spectrum of the output light of the DFB-LD by the non-regenerate optical four-wave mixing. It is known that the following equation stands among the angular frequency ωs of the probe light, the angular frequency ωp of the pump light, and the angular frequency ωc of the phase-conjugate light:

$$\omega c = 2\omega p - \omega s.$$

Hence, it is possible to convert the probe light (signal light) ωs into the phase-conjugate light ωc (light frequency conversion or wavelength conversion).

It is also known that the single oscillation mode of the DFB-LD is changed by controlling the currents respectively flowing in the three p-side electrodes 31a–31c to have different values. For example, a drive circuit 40 shown in FIG. 7B controls the currents applied to the p-side electrodes 31a and 31c to have constant levels and increases the current applied to the p-side electrode 31b. In this case, the oscillation wavelength shifts to the long wavelength side. Thus, it is possible to arbitrarily vary the wavelength of the pump light ωp (for example, 1554 nm, 1563 nm). Thus, it is possible to realize wavelength arrays as those of groups 1 and 2 shown in FIG. 14. It is also possible to configure the apparatus so that substitute lights (phase-conjugate lights) λy1, λy2 and λy3 can be produced from a single branch light λxj by arbitrarily varying the wavelength of the pump light ωp. The DFB-LD can be used as one which has an amplification band located within a given band included in the range of 1.3 μm to 1.6 μm.

Figure 9:
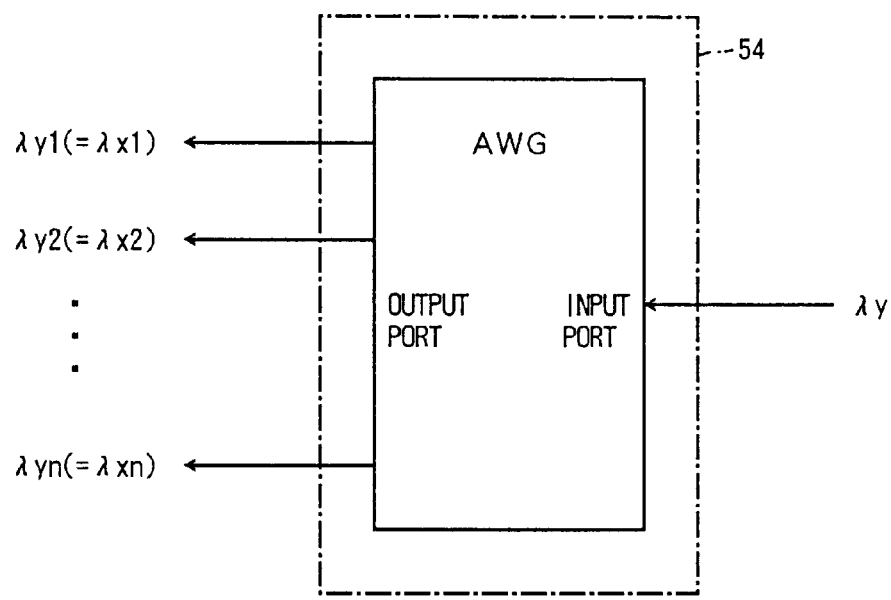
FIG. 9 is a block diagram of a substitute light delivery part used in the first embodiment of the present invention.

FIG. 9 is a diagram of the substitute light delivery part 54 used in the first embodiment of the present invention. The input substitute light λy (which corresponds to, for example, the working light λx1) from the wavelength converting part 53 is output to only the output port for the substitute light λy1 by the AWG distributor and is then delivered to the corresponding photocoupler 12-1. The above operation is carried out for each of the other substitute lights λy2–λyn.

Figure 10:
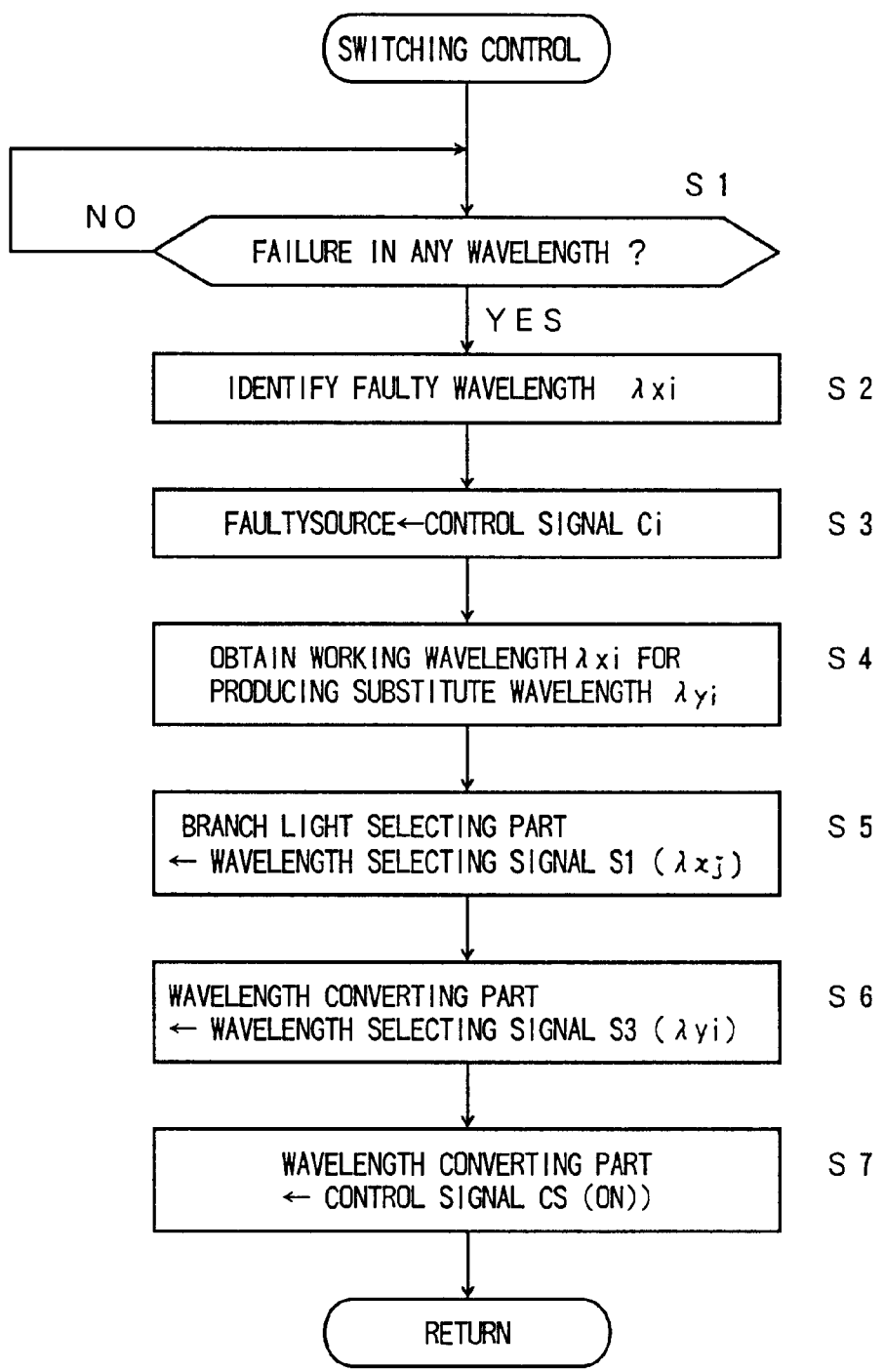
FIG. 10 is a flowchart of a working light source switching control performed in the first embodiment of the present invention.

FIG. 10 is a flowchart of the working light source switching control carried out in the first embodiment of the present invention. Normally, the process shown in FIG. 10 is performed after system power ON. At step S1, it is determined, based on an error detection signal ET of the optical spectrum analyzer 18, whether any of the wavelengths (working light sources) is faulty. If there are no faulty wavelengths, step S1 is performed again. If a failure is detected in any of the wavelengths, the faulty wavelength λxi (i=1~n) is identified at step S2. At step S3, a control signal Ci is supplied to the faulty working light source 11i, which is controlled to stop the light output. At step S4, the normal working wavelength λxj used to produce the substitute wavelength λyi is obtained by a computation or the table shown in FIG. 14. At step S5, the wavelength select signal S1 is supplied to the branch light selecting part 51, which thus selects the corresponding branch light λxj. At step S6, the wavelength select signal S3 is supplied to the wavelength converting part 53, which thus extracts the corresponding FWM light λyi. At step S7, the control signal CS is sent to the wavelength converting part 53, which thus activates the optical four-wave mixing of the non-linear amplifier.

The maintenance person is informed of the failure of the working light source 11i. Responsively, the maintenance person takes off the faulty working light source 11i and inserts a repaired or new source. Further, if necessary, the maintenance person checks the operation characteristics (the wavelength, light output level and so on). If there is no abnormality, the maintenance person depresses a restoration reset button (not shown for the sake of simplicity) for the replaced light source 11i.

Figure 11:
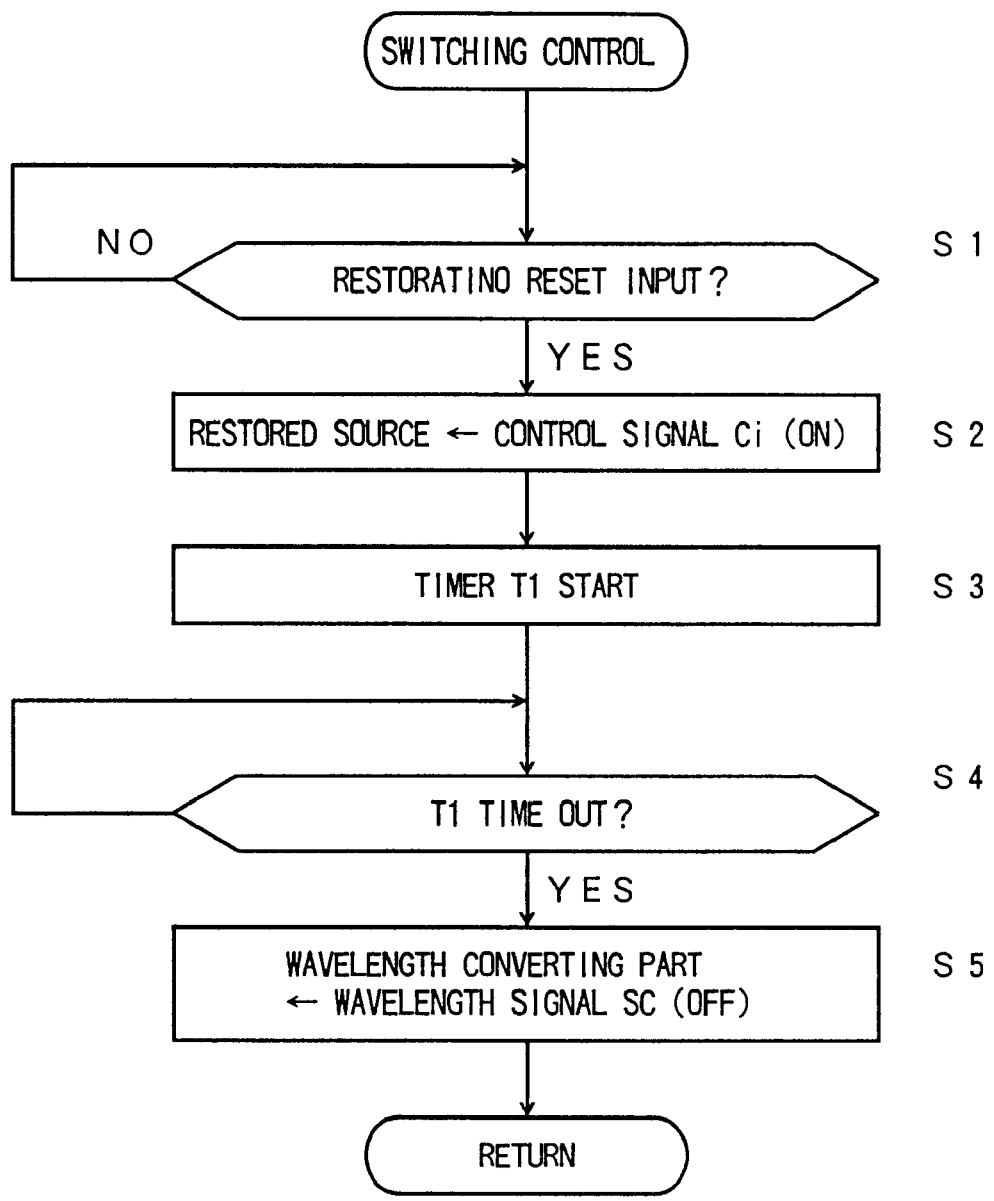
FIG. 11 is a flowchart of a working light source switching-back control performed in the first embodiment of the present invention.

FIG. 11 is a flowchart of a working light source switch-back control carried out in the first embodiment of the present invention. Normally, the control process shown in FIG. 11 is started after switching of the faulty light source is performed. At step S11, the control process waits for a restoration reset input related to the faulty working light source 11$i$. Upon the restoration reset input, at step S12, the control signal Ci is supplied to the restored light source 11I, which is turned ON to emit the light output. At this time, normally, it takes a certain time for the operation of the restored light source 11$i$ to be settled. It is thus preferable that a timer T1 for measuring a given time provided in the switching control part 60 is started, and step S14 waits for the time-out of the timer T1.

At that time, the following two light power switchback formations may be employed. In the first formation, the optical limiter amplifier OLA shown in FIG. 2 is not provided. Alternatively, a linear optical amplifier OA is provided. For example, provided that the working light source 11$i$ is restored, the restored light $\lambda$x1 and the substitute light $\lambda$y1 are combined in the photocoupler 12-1. Thus, the light input level of the optical modulator 13-1 is temporarily increased by 3 dB. However, normally, an optical level variation of such a degree does not cause a harmful light serge to the later-stage optical components of the transmitter system and the optical system of the receiver side. In addition, the optical level variation of such a degree falls within a variation-resistance range of the normal transmitter and receiver systems, and the decoding of the main signals is not affected significantly. Thereafter, when the substitute light $\lambda$y1 of the wavelength converting part 53 is stopped, the light input level of the optical modulator 13-1 is returned to the standard value.

In the second formation of light power switchback, the optical limiter amplifier OLA shown in FIG. 2 is provided, or the linear optical amplifier OA is operated in the gain saturation range. The optical limiter amplifier OLA or the linear optical amplifier OA can be realized by selecting the performance of optical fiber amplifiers so that the gain saturation range is obtained in the respective wavelength bands. Alternatively, semiconductor optical amplifiers are driven so that the gain saturation range is obtained in the respective wavelength bands. Even if there is a 3 dB variation on the output side of the photocoupler 12-1, such a variation is absorbed by the non-linear amplifying function of the OLA/OA, so that the light output power of the OLA/LA can be maintained at an approximately constant level. Thus, there is no possibility that an unbalance among the signal powers of the light signals $\lambda$x1~$\lambda$xn occurs. As a result, data communications in the switchback section can continue with a high reliability.

Turning to FIG. 11 again, when the time-out of the timer T1 is detected at step S14, the control signal CS is supplied to the wavelength converting part 53 at step S15. Thus, the optical four-wave mixing of the non-linear optical amplifier or the outputting of the substitute light is disabled. Thus, an instantaneous breakdown does not occur in the input light applied to the optical modulator 13 even by any of the above switch-back formations, so that non-breakdown switchback can be realized.

Thereafter, the switching control part 60 enters the redundant switching control shown in FIG. 10. As described above, the backup using the substitute light and switchback to the restored light source can automatically be performed. Thus, it is possible to safely work the WDM transmission system with high reliability.

Figure 12:
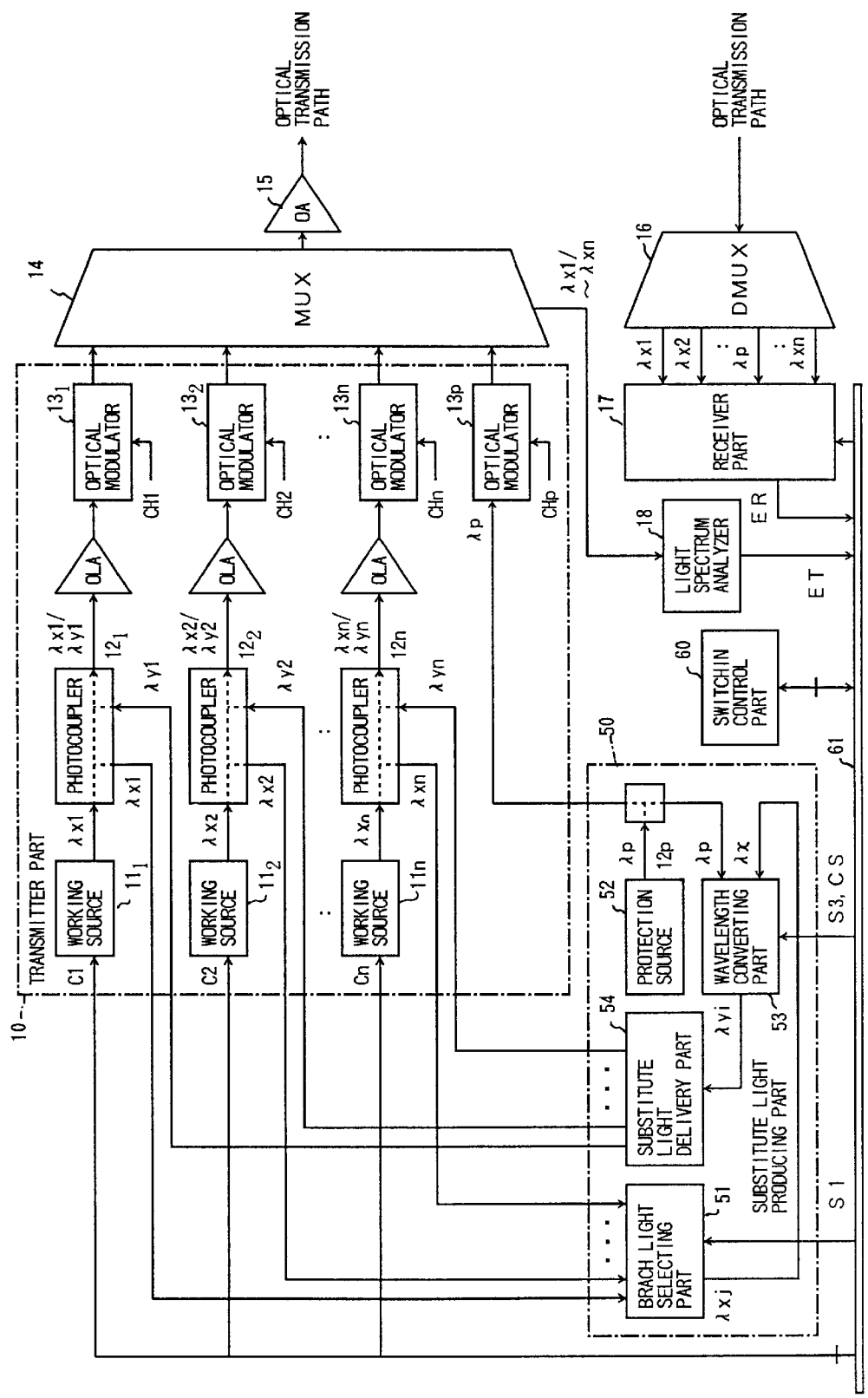
FIG. 12 is a block diagram of a WDM transmission apparatus according to a second embodiment of the present invention.

FIG. 12 is a block diagram of a WDM transmission transmitter receiver according to a second embodiment of the present invention. In FIG. 12, parts which are the same as those shown in the previously described figures are given the same reference numbers. The protection light $\lambda$p of the protection light source 52 (or the DFB-LD) is used not only to produce the substitute light but also to a communication light wave $\lambda$p of a protection channel via which the main signal is transferred over the transmission path between the apparatus of interest and the remote station or office. The basic structure and operation of the WDM transmitter receiver according to the second embodiment of the present invention is the same as that of the WDM transmitter receiver according to the first embodiment thereof. However, the first and second embodiments of the present invention differ from each other in that an optical modulator 13-$p$ is newly provided in FIG. 12. The optical modulator 13-$p$ modulates the protection light $\lambda$p after branching by an electric signal CHp of the protection channel. The light signal of the protection channel is multiplexed with the other lights by the multiplexer 14. Further, the receiver system shown in FIG. 12 includes a structure for performing a receive process for the light signal of the protection channel.

According to the second embodiment of the present invention, the protection communication channel $\lambda$p is provided on the optical transmission path. Thus, it is possible to perform not only the redundant switching control of the working light sources 11-1–11-$n$ of its own office but also the automatic redundant switch/switchback control of the working communication channel on the optical transmission path. Additionally, the working channel lights such as $\lambda$x1 and $\lambda$xn are located in the both shoulder portions of the communication band. Thus, even when the working light sources 11-1 and 11-$n$ work normally, the error rate obtained at the receiver system of the remote office may be degraded due to an abnormality resulting from a failure which occurs in an intermediate optical cable or the operation of a repeater. Even in such a case, according to the second embodiment of the present invention, it is possible to switch the working channel light $\lambda$x1 or $\lambda$xn with the degraded error rate to the protection channel light $\lambda$p located in the center of the wavelength pass band. Thus, it is possible to provide high-quality protection communication channel.

With regard to the working channel in which a failure (breakdown, degradation or the like) is detected in reception in the remote office, failure notification information is transmitted via the maintenance channel from the remote office. In the office which receives the failure notification information, it is determined that the notified failure is a failure that occurs in the transmission path section if the light transmission level (wavelength, light output level) of the own office. Then, the main signal of the faulty channel is connected to and transmitted via the protection channel.

The automatic switch/switchback control between the working and protection channels performed by the channel switching control part 60 can be implemented by an automatic switch/switchback control using APS (automatic Protection Switch) bytes (K1, K2) in the SDH (Synchronous Digital Hierarchy system. Thus, with the simple structure, it is possible to efficiently realize the redundant configuration of n (working):1 (protection) with respect to not only the light sources but also optical communication channels.

Figure 13:
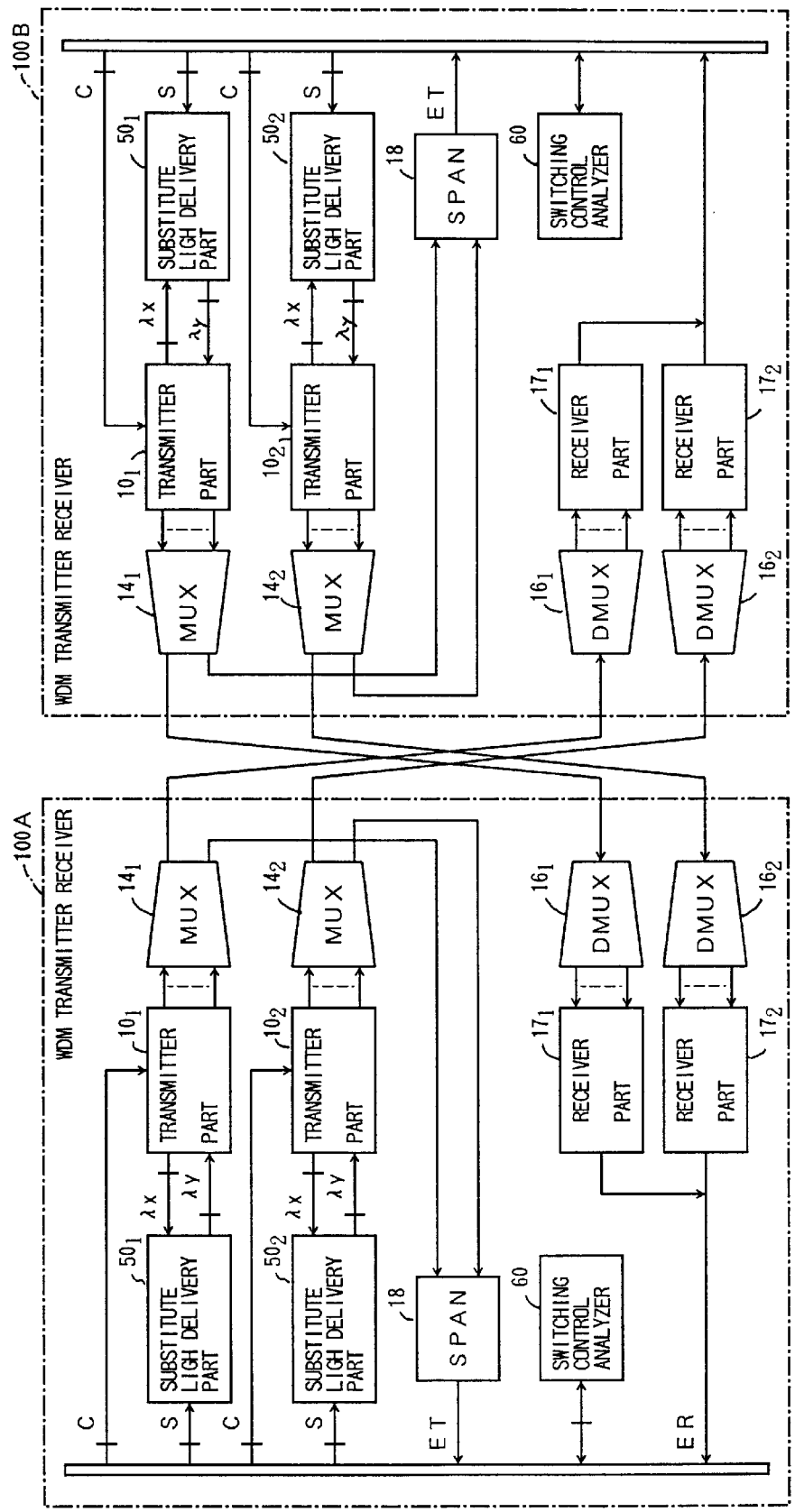
FIG. 13 is a block diagram of a WDM transmission apparatus according to a third embodiment of the present invention.

FIG. 13 is a block diagram of a WDM transmitter receiver according to a third embodiment of the present invention. In FIG. 13, parts that are the same as those shown in the previously described figures are given the same reference numbers. In the transmitter receiver shown in FIG. 13, a plurality of redundant configurations, each of which is the n:1 redundant configuration used in the first and second embodiments of the present invention, are provided in parallel to a plurality of bands. In FIG. 13, 100A and 100B indicate WDM transmitter receiver, 10-1 and 10-2 indicate first and second transmitter parts, 14-1 and 14-2 indicate first and second optical multiplexers, 16-1 and 16-2 indicate first and second optical demultiplexers, 17-1 and 17-2 indicate first and second receiver parts, 50-1 and 50-2 indicate first and second substitute light producing parts, 18 indicates a light spectrum analyzer (SPAN), and 60 indicates a switching control part. Each of the above parts is the same as the corresponding part which has been described in the first and second embodiments of the present invention.

FIG. 14 shows the light wave array also applied to the third embodiment of the present invention. The light wave array has two redundant systems of the first and second groups, each of which groups is configured so that the automatic switch/switchback control of the 8 (working):1 (protection) redundant configuration is available. Thus, it is possible to easily configure the redundant systems of an arbitrary number of groups.

In the aforementioned embodiments of the present invention, the four-wave mixed light $\lambda yi$ is obtained by the following expression in which the protection light $\lambda p$ is used as a pump light:

$$\lambda yi = 2\lambda p - \lambda xj.$$

However, the present invention is not limited to the above. For example, the four-wave mixed light $\lambda yi$ may be produced by the following expression in which the branch light $\lambda xj$ is used as a pump light:

$$\lambda yi = 2\lambda xj - \lambda p.$$

According to the present invention, it is possible to perform, with the simple redundant configuration, the automatic switch/switchback control of the light sources with high reliability and low cost. This greatly contributes to the spread of the WDM transmission system and improvements in the reliability thereof.

The present invention is not limited to the specifically disclosed embodiments, and variations and modifications may be made without departing from the scope of the present invention.

What is claimed is:

1. A redundant switch method comprising the steps of:
   producing a substitute light of a wavelength identical to that of a faulty working light source which is one of working light sources having different wavelengths by optical four-wave mixing using a protection light from a protection light source and a branch light which is one of branch lights obtained from the working light sources and has a given relationship with the faulty working light source; and
   replacing a transmission light of the faulty working light source by the substitute light.

2. The redundant switch method as claimed in claim 1, further comprising the steps of:
   using a branch light obtained from the protection light source for a protection communication channel in a transmission path section; and
   transmitting, via the protection communication channel, a main signal transferred via a faulty working channel.

3. The redundant switch method as claimed in claim 1, wherein a wavelength of the protection light source is located in a center of a wavelength array in which the wavelengths of the working light sources are arranged at equal intervals.

4. The redundant switch method as claimed in claim 1, wherein the step of producing the substitute light produces the substitute light using the following equation:

$$\lambda yi = 2\lambda p - \lambda xj$$

where $\lambda yi$ is the wavelength of the substitute light, $\lambda xj$ is the wavelength of one of the working light sources having said given relationship with the faulty working light source.

5. A WDM apparatus comprising:
   working light sources having different wavelengths;
   a protection light source having a wavelength different from those of the working light sources;
   photocouplers which cause lights from the working light sources to branch and add substitute lights to optical transmission routes of the working light sources;
   a branch light selecting part which selects one of branch lights from the photocouplers in accordance with a control signal externally supplied;
   a wavelength converting part which produces the substitute lights by optical four-wave mixing using the branch lights from the photocouplers and the protection light from the protection light source;
   a substitute light delivery part which deliver the substitute lights to the photocouplers; and
   a switching control part which controls the branch light selecting part and the wavelength converting part so that one of the substitute lights which has a wavelength identical to that of a faulty one of the working light sources is produced and applied to a corresponding one of the photocouplers.

6. The WDM apparatus as claimed in claim 5, further comprising:
   a photocoupler which causes the protection light to branch;
   an optical modulator which modulates a branch protection light from the photocoupler by an electric main signal; and
   an optical multiplexer which multiplexes the branch protection light and signal lights from the working light sources and sends a multiplexed signal to a transmission path section,
   wherein the branch protection light is made to be modulated by a main signal of a faulty channel which is one of working channels.

7. The WDM apparatus as claimed in claim 5, wherein the wavelength of the protection light source is located in a center of a wavelength array in which the wavelengths of the working light sources are arranged at equal intervals.

8. The WDM apparatus as claimed in claim 5, wherein the switching control part produces the substitute light using the following equation:

$$\lambda xj = 2\lambda p - \lambda xi$$

where $\lambda xj$ is the wavelength of the faulty light source, $\lambda xi$ is the wavelength of one of the branch lights to be selected by the branch light selecting part, and $\lambda p$ is the wavelength of the protection light source.

9. The WDM apparatus as claimed in claim 5, wherein the branch light selecting part comprises:

a plurality of optical switches turning ON/OFF the branch lights in accordance with an external control signal; and an optical multiplexer which multiplexes the branch lights from the optical switches.

10. The WDM apparatus as claimed in claim 5, wherein the branch light selecting part comprises:

an optical multiplexer which multiplexes the branch lights; and a band-pass filter which allows only one of the branch lights arranged in a multiplexed formation to pass therethrough.

11. The WDM apparatus as claimed in claim 5, wherein the branch light selecting part comprises:

an optical multiplexer which multiplexes the branch lights;

an optical fiber Bragg grating which reflects only one of the branch lights arranged in a multiplexed formation in accordance with an external control signal; and an optical circulator interposed between the optical multiplexer and the fiber Bragg grating.

12. The WDM apparatus as claimed in claim 5, wherein the wavelength converting part comprises a semiconductor optical amplifier as an optical non-linear element for the optical four-wave mixing.

13. The WDM apparatus as claimed in claim 5, wherein the wavelength converting part comprises a dispersion shift fiber as an optical non-linear element for the optical four-wave mixing.

14. The WDM apparatus as claimed in claim 5, wherein:

the wavelength converting part comprises a DFB laser diode as an optical non-linear element for the optical four-wave mixing; and a pump light generated in the DFB laser diode is used as a protection light source instead of the protection light source separately provided.

15. The WDM apparatus as claimed in claim 12, wherein the wavelength converting part comprises a band-pass filter which is provided on an output side of an optical non-linear element and which has a variable pass-band range controllable by an external control signal.

16. The WDM apparatus as claimed in claim 5, wherein the switching control part turns OFF adding of the substitute light after the faulty working light source is restored and starts to emit a light output.

17. The WDM apparatus as claimed in claim 12, further comprising optical limiters provided at output sides of the photocouplers, the optical limiters causing the semiconductor optical amplifiers to operate in a gain saturation range.

18. The WDM apparatus as claimed in claim 12, further comprising optical limiters provided at output sides of the photocouplers, the optical limiters causing the semiconductor optical amplifiers which are rare-earth doped optical amplifiers to operate in a gain saturation range.

* * * * *